United States Patent
Smith et al.

(10) Patent No.: US 10,450,173 B2
(45) Date of Patent: Oct. 22, 2019

(54) GYPSY FOR WINDLASS AND METHOD FOR ITS MANUFACTURE

(71) Applicant: LEWMAR LIMITED, Havant (GB)

(72) Inventors: Nigel Christopher Smith, Warsash (GB); Sean Daniel Wilson, Portsmouth (GB); Philip David Roberts, Fareham (GB); Andrew Palmer, Portsmouth (GB)

(73) Assignee: LEWMAR LIMITED, Havant (GB)

( * ) Notice: Subject to any disclaimer, the term of this patent is extended or adjusted under 35 U.S.C. 154(b) by 55 days.

(21) Appl. No.: 15/576,518

(22) PCT Filed: May 11, 2016

(86) PCT No.: PCT/GB2016/051354
§ 371 (c)(1),
(2) Date: Nov. 22, 2017

(87) PCT Pub. No.: WO2016/193662
PCT Pub. Date: Dec. 8, 2016

(65) Prior Publication Data
US 2018/0127247 A1 May 10, 2018

(30) Foreign Application Priority Data
May 29, 2015 (GB) .................. 1509246.3

(51) Int. Cl.
*B66D 1/72* (2006.01)
*B63B 21/16* (2006.01)
(Continued)

(52) U.S. Cl.
CPC ................ *B66D 1/72* (2013.01); *B63B 21/16* (2013.01); *B63B 21/22* (2013.01); *B66D 1/30* (2013.01);
(Continued)

(58) Field of Classification Search
CPC ... B63B 21/16; B63B 21/22; B63B 2021/203; B66D 1/30; B66D 1/36; B66D 1/72; B66D 3/006; B66D 3/02; F16H 55/06; F16H 55/14; F16H 55/30
See application file for complete search history.

(56) References Cited

U.S. PATENT DOCUMENTS 3,810,529 A 5/1974 Tosato et al.
4,841,898 A * 6/1989 Ballantyne ............. B63B 21/22
114/230.23
(Continued)

FOREIGN PATENT DOCUMENTS

AU 2002323890 1/2004
CA 2311141 A1 * 12/2000 ............... B66D 1/72
(Continued)

*Primary Examiner* — Emmanuel M Marcelo
(74) *Attorney, Agent, or Firm* — Leason Ellis LLP

(57) ABSTRACT

A gypsy is disclosed, adapted for mounting in a windlass for hauling and/or veering anchor rode. A chain-engagement region (12) of the gypsy comprises chain link pockets (18) sized and spaced around the chain-engagement region to engage with chain of the anchor rode. A line-engagement region (24) is provided, with an array of rope grip features (26) spaced around the line-engagement region. The chain-engagement region of the gypsy is formed from a polymeric material and the line-engagement region is formed from a metal material.

11 Claims, 3 Drawing Sheets

Section X-X

(51) Int. Cl.
*B63B 21/22* (2006.01)
*B66D 1/30* (2006.01)
*F16H 55/30* (2006.01)
B66B 7/06 (2006.01)
B66D 1/36 (2006.01)
B66D 5/24 (2006.01)

(52) U.S. Cl.
CPC ............ *F16H 55/303* (2013.01); *B66B 7/068* (2013.01); *B66D 1/36* (2013.01); *B66D 5/24* (2013.01)

(56) References Cited

U.S. PATENT DOCUMENTS

| | | |
|---|---|---|
| 5,271,608 A | 12/1993 | Kubono |
| 5,803,008 A * | 9/1998 | Georgens ................ B63B 21/04 114/293 |
| 6,394,421 B1 | 5/2002 | Henly |
| 2008/0153645 A1 | 6/2008 | Chiu |
| 2008/0256765 A1* | 10/2008 | Sam ........................ B63B 21/16 24/483 |
| 2011/0198547 A1 | 8/2011 | Matos |
| 2013/0161850 A1 | 6/2013 | Harris et al. |
| 2017/0267317 A1* | 9/2017 | Aimcharoenchaiyakul ................ B63B 21/227 |

FOREIGN PATENT DOCUMENTS

| | | |
|---|---|---|
| EP | 1061033 | 12/2000 |
| GB | 548642 | 10/1942 |
| WO | WO 93/07047 | 4/1993 |
| WO | WO 2009/0131463 | 10/2009 |

* cited by examiner

Section X-X

GYPSY FOR WINDLASS AND METHOD FOR ITS MANUFACTURE

CROSS-REFERENCE TO RELATED PATENT APPLICATIONS

This application is a U.S. National Phase Application under 35 U.S.C. § 371 of International Patent Application No. PCT/GB2016/051354, filed May 11, 2016, which claims the priority of British Patent Application No. 1509246.3, filed May 29, 2015, each of which is incorporated by reference as if expressly set forth in their respective entirety herein.

BACKGROUND TO THE INVENTION

Field of the Invention

The present invention relates to a gypsy, for example for marine applications such as hauling and/or veering anchor rode on a windlass, and to a method for manufacturing a gypsy.

Related Art

Windlasses are known for use on marine craft for hauling and veering anchor rode (the line and/or chain to which the anchor of the marine craft is attached). An example of a known windlass is shown in U.S. Pat. No. 6,394,421. Such a windlass includes a gypsy (in which a line or chain executes only a maximum of a single turn between inward and outward runs). When the anchor is dropped, it is desirable that the anchor rode can pay out freely under the weight of the anchor. However, to haul in the anchor, a drive mechanism of the windlass engages the gypsy, which can then rotate to haul in the anchor.

In order to ensure reliable engagement of chain links by the gypsy over just one turn, typically the gypsy presents chain link pockets, sized and spaced around a chain-engagement region of the gypsy to engage with the chain of the anchor rode.

A windlass gypsy, such as in the windlass disclosed in U.S. Pat. No. 6,394,421, is formed from a metal such as brass or stainless steel, the material being selected for durability and strength in marine environments. In view of the relatively complex shape of the chain link pockets, it is necessary to cast and subsequently machine the gypsy in at least two parts. This is relatively cost intensive and time intensive.

A windlass having a gypsy made from moulded polymer has been known—an example being the Simpson-Lawrence Horizon 400.

SUMMARY OF THE INVENTION

The present inventor has realised that traditional metal gypsies such as used in U.S. Pat. No. 6,394,421 could be improved. In particular, in operation such gypsies are noisy in view of the metal-on-metal contact between the chain and the gypsy during hauling and veering of the anchor rode.

As explained above, there is an example of a known windlass with a moulded polymer gypsy. However, the present inventor considers that such an approach is not widely accepted in view of problems of wear of the rope grip features, located at the line-engagement region, radially inwardly from the chain-engagement region.

Furthermore, the present inventor considers that it would be of interest to improve the gypsy manufacturing process, in terms of cost and efficiency.

The present invention has been devised in order to address at least one of the above problems. Preferably, the present invention reduces, ameliorates, avoids or overcomes at least one of the above problems.

In a general aspect, the present invention adapts the prior art by forming the chain-engagement region of the gypsy from a polymeric material and the line-engagement region from a metal material.

Accordingly, in a first preferred aspect, the present invention provides a gypsy, adapted for mounting in a windlass for rotation for hauling and/or veering anchor rode, wherein the gypsy has a chain-engagement region comprising chain link pockets sized and spaced around the chain-engagement region to engage with chain of the anchor rode, and a line-engagement region with an array of rope grip features spaced around the line-engagement region, wherein the chain-engagement region of the gypsy is formed from a polymeric material and the line-engagement region is formed from a metal material.

In a second preferred aspect, the present invention provides a process for manufacturing a gypsy, for mounting in a windlass for rotation for hauling and/or veering anchor rode, wherein the gypsy has a chain-engagement region comprising chain link pockets sized and spaced around the chain-engagement region to engage with chain of the anchor rode, a line-engagement region with an array of rope grip features spaced around the line-engagement region, the process including the steps:

forming the line-engagement region of the gypsy from a metal material; and forming the chain-engagement region of the gypsy from a polymeric material.

As will be understood, the use of a polymeric material in this manner allows the reduction or avoidance of metal-on-metal contact between the gypsy and the chain of the anchor rode. Furthermore, the use of a metal material for the line-engagement region allows the reduction or avoidance of erosion of the rope grip features through contact with the rope of the anchor rode.

The first and/or second aspect of the invention may have any one or, to the extent that they are compatible, any combination of the following optional features.

Preferably, the gypsy has a composite form. In this case, a core part or parts of the gypsy may be formed from a metal material. For example, the core part may be formed from brass or stainless steel. The chain-engagement region of the gypsy may then be formed over the core part. A particularly preferred approach is to form the chain-engagement region of the gypsy by moulding using the polymeric material.

Suitable moulding processes include injection moulding, in which the core part is held in a suitable mould and precursor polymeric material is injected into a space formed adjacent the core part and solidified (e.g. by cooling or curing or both).

Preferably at the interface between the core part and the chain-engagement region of the gypsy, there are formed keying features in the core part. These assist in the secure attachment of the chain-engagement region with the core part.

Preferably, the core part is formed from a first core part and a second core part. The first core part and the second core part are fastened together through holes in each of the first and second core parts to form the core part. Preferably the first core part and the second core part are bolted or screwed together. The core part may for example be formed by forging. Optionally, the forged part may then be machined. Alternatively the core part can be machined from a starting workpiece, and/or it may be cast.

The core part preferably engages with a shaft of the windlass. This is advantageous, in view of the high loads experienced by this part of the gypsy.

The core part preferably engages with a brake of the windlass. The brake of the windlass is preferably capable of disengagement, in order to allow free fall of the anchor. The brake may be operable using a clutch, for example a cone clutch adapted to be received in a correspondingly shaped recess in the core part, disposed symmetrically around the axis of rotation of the gypsy.

Additionally, the core part preferably provides the line-engagement region. In the complete gypsy, the line-engagement region is located radially inwardly from the chain-engagement region of the gypsy. The line-engagement region is intended to engage with rope of the anchor rode, in contrast with the intention that the chain of the anchor rode engages with the chain-engagement region of the gypsy. The line-engagement region is therefore provided with an array of rope grip features, spaced around the line-engagement region. The line-engagement region preferably has a narrower maximum axial extent than the chain-engagement region, the chain of the anchor rode thereby being prevented from entering the line-engagement region.

Preferably, the polymeric material has lower density than the core part of the gypsy. In this way, compared with a metal gypsy of the same overall size and shape, the gypsy of the present invention can be of lighter weight. Preferably, the polymeric material is 30% glass filled Nylon (PA66 GR30).

The chain-engagement region may have one or more strengthening ribs formed. These may define between them voids, resulting in a lower overall weight for the same overall size of gypsy. These ribs and voids are preferably formed at a surface of the gypsy other than the surface of the chain link pockets.

In use, the windlass can be a vertical or horizontal windlass. Vertical or horizontal refers to the orientation of the drive shaft of the windlass.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS, AND FURTHER OPTIONAL FEATURES OF THE INVENTION

Figure 1:
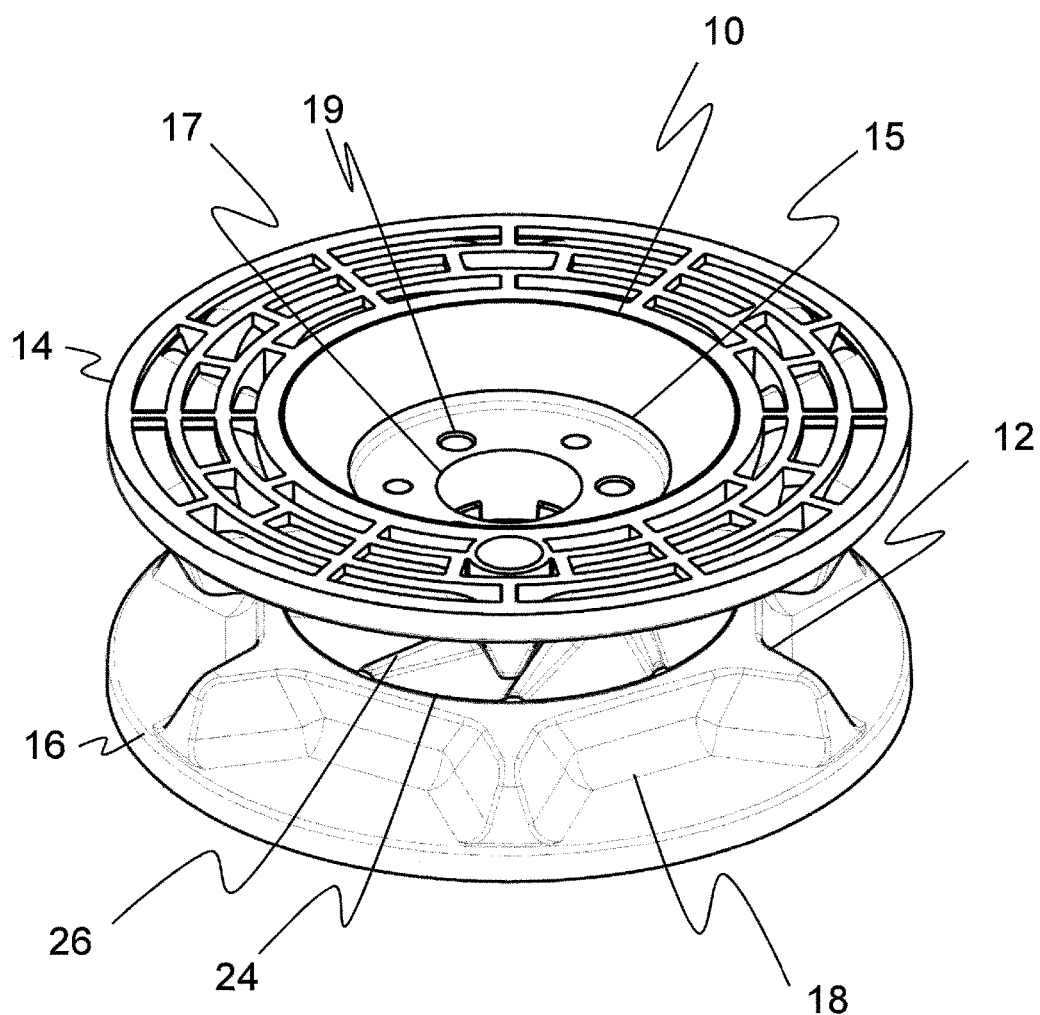
FIG. 1 shows a schematic perspective view of a gypsy according to an embodiment of the invention.
Figure 2:
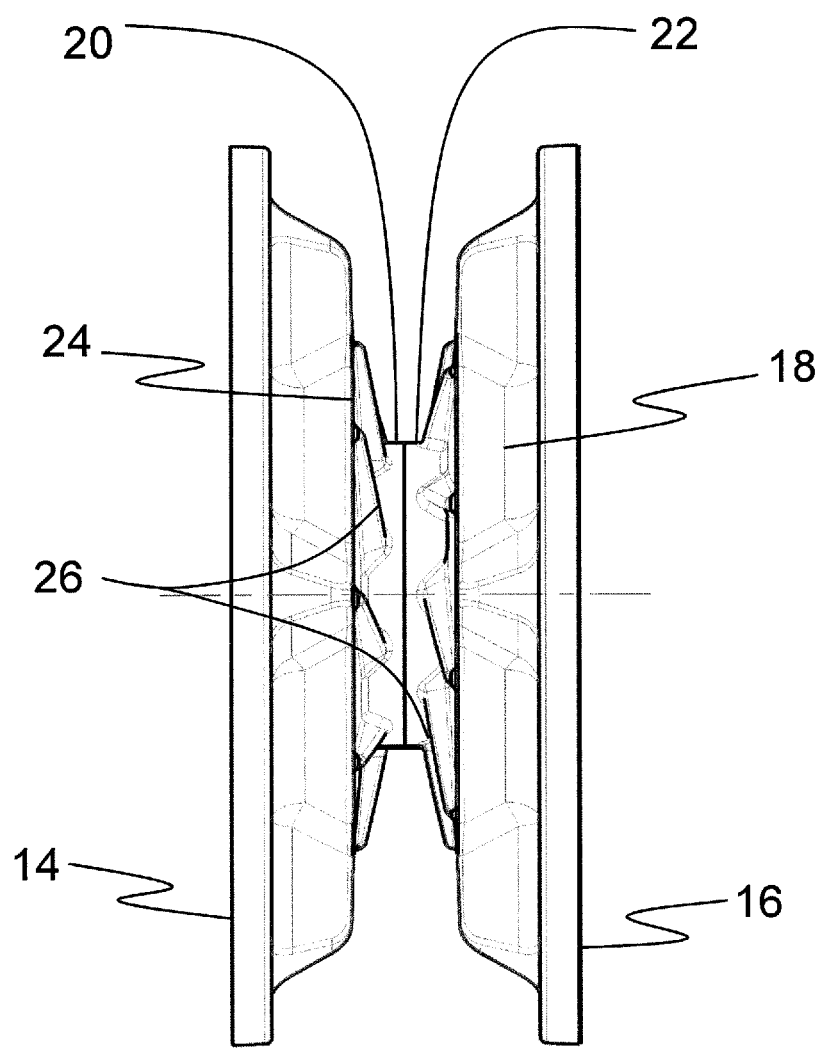
FIG. 2 shows a schematic side view of a gypsy according to an embodiment of the invention.
Figure 3:
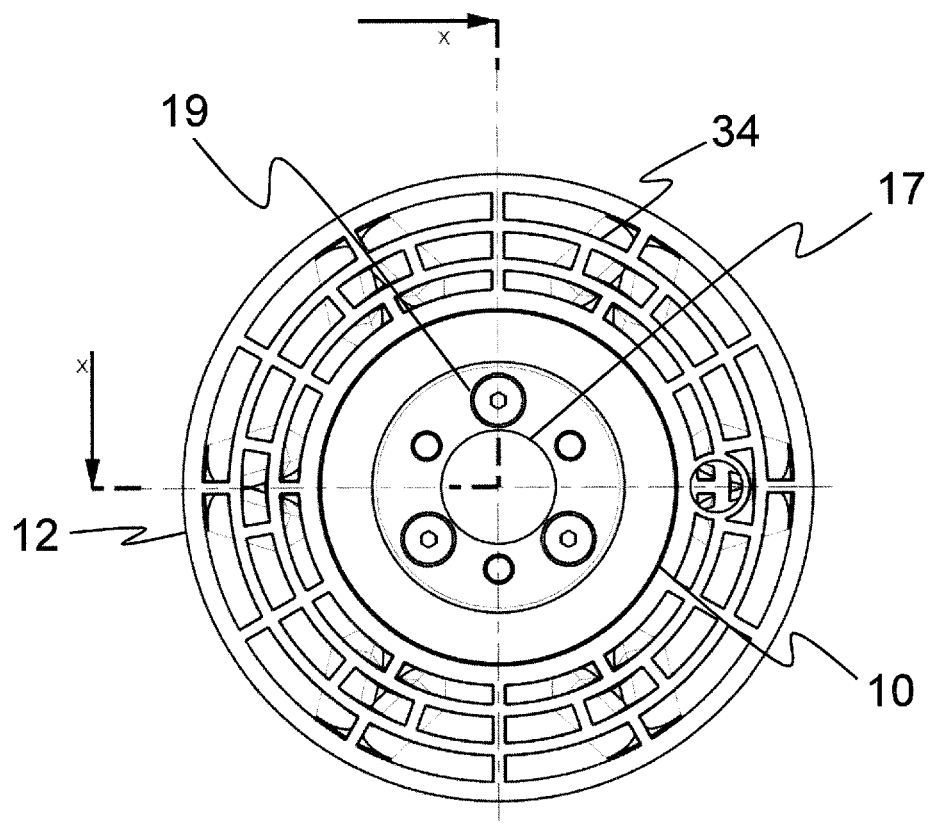
FIG. 3 shows a schematic top view of a gypsy according to an embodiment of the invention.
Figure 4:
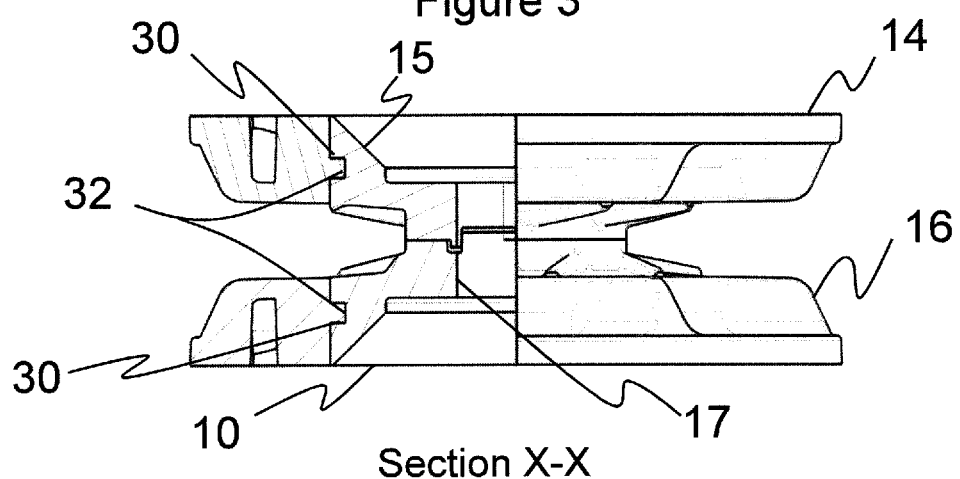
FIG. 4 shows a view of section X-X from FIG. 3.

FIGS. 1 to 3 show a gypsy according to an embodiment of the invention in various orientations. FIG. 4 shows a section X-X through the gypsy as indicated in FIG. 3. The same reference numbers are used for the same features in the different drawings, and some reference numbers are omitted from various drawings where they are used and explained elsewhere.

FIG. 1 shows a gypsy according to an embodiment of the invention comprising a core part 10, and a chain-engagement region 12. The chain-engagement region 12 of the embodiment comprises a first chain-engagement part 14 and a second chain-engagement part 16. The chain-engagement region comprises chain link pockets 18, which are formed in the chain-engagement region parts 14, 16. The chain-engagement region 12 formed by the first and second chain-engagement parts 14, 16 is made from a polymeric material. Preferably, the polymeric material is 30% glass filled Nylon (PA66 GR30) however the skilled person will appreciate that other polymers having suitable mechanical properties and being suitable for use in a marine environment may be used.

By forming the chain-engagement region 12 from a polymer, the gypsy can run more quietly than a gypsy fabricated entirely from metal. As will be understood, the use of a polymeric material in this manner allows the reduction or avoidance of metal-on-metal contact between the gypsy and the chain of the anchor rode.

The chain link pockets 18 are shaped and spaced around the chain-engagement region 12 in order to engage with chain links of an anchor rode. By forming chain link pockets 18 in the chain-engagement region of the gypsy, the gypsy ensures reliable engagement of the anchor rode with the gypsy over one turn of the gypsy. When the gypsy is assembled, the chain link pockets on each chain-engagement section are aligned to oppose each other.

The core part 10 includes a bore 17 for engaging with a shaft of the windlass. Holes 19 are modified for attaching two halves of the gypsy together with screws, bolts, pins or other suitable fasteners.

Preferably the core part 10 includes a brake-engagement section for engaging with a brake (not shown) of the windlass. The brake of the windlass is capable of being disengaged from the gypsy, in order to allow free rotation of the gypsy, for example under the free fall of an anchor. More preferably the brake is operable using a cone clutch. In such a case, the core part 10 includes a corresponding frusto-conical recess 15 shaped around the axis of rotation of the gypsy to accommodate the cone clutch.

The core part 10 is made from a metal material, preferably from brass or stainless steel. By manufacturing the core part 10 from metal, a hard wearing running surface is provided for the cone and shaft of the gypsy. This is well suited for resisting the typical forces experienced by a gypsy in a marine environment. Preferably the polymeric material used for the chain-engagement region 12 has a lower density than the metal material used for the core part 10. This reduces the overall weight of the gypsy compared to fabricating it entirely from the metal material.

As shown in FIG. 2 the core part 10 can be constructed from a separate first core part 20 and second core part 22. The first and second parts 20, 22 are then attached together by fasteners through holes 19. Preferably, the first and second core parts 20, 22 are bolted or screwed together. In an alternative embodiment, the core part 10 is formed as a single part.

The core part 10 includes a line-engagement region 24 for engaging with the rope of an anchor rode. The line-engagement region 24 is located radially inwards from the chain-engagement region 12 of the gypsy. The line-engagement region 24 includes an array of rope grip features 26 in order to provide increased grip on the rope as it is wound round the gypsy. In the present embodiment the rope grip features 26 are raised linear or spiral ridges from the line-engagement region 24. The rope grip features are spaced around each of the first and second core parts 20, 22. It will be appreciated that any feature suitable for increasing the friction between the rope and the line-engagement region 26 could be used as a rope grip feature. By forming the rope grip features 26 from the metal material of the core part 10, a hard wearing surface is provided which reduces or avoids the erosion of the rope grip features 26 due to contact with the of the anchor rode.

FIG. 4 shows a view of section X-X from FIG. 3. At the interface between the metallic core part 10 and the polymeric chain-engagement parts 14, 16 of the gypsy, there are formed keying features 30 in the core part 10 and interlocking tabs 32 in the chain-engagement parts 14, 16. It will be appreciated that other similar interlocking features would be suitable for assisting in the secure attachment of the chain-engagement region to the core part.

FIG. 3 shows an axial view of the gypsy. The chain-engagement region 12 may have one or more strengthening ribs 34 formed. These define between them voids, resulting in a lower overall weight for the same overall size of gypsy. These ribs and voids are preferably formed at a surface of the gypsy other than the surface of the chain link pockets.

A gypsy according to a preferred embodiment of the invention typically has a diameter of at least 100 mm at its maximum extent. A gypsy of 100 mm diameter according to the preferred embodiment has a maximum rated working load of 150 kg. A gypsy of 100 mm diameter would be expected to be used in a windlass with a motor capable of hauling a maximum load of 600 kg.

A larger diameter gypsy according to an embodiment of this invention has a maximum rated working load of up to 250 kg. Such a larger diameter gypsy would be used in a windlass with a motor capable of hauling loads up to 1000 kg.

The method for manufacturing a gypsy according to a preferred embodiment includes the step of forming core part 10 from a metallic material. The core part 10 may be made from a first core part 20 and a second core part 22 which are subsequently joined together, as explained above. Alternatively the core part 10 may be formed from a single piece. The core part 10 is preferably made by forging or stamping followed by machining. It will be appreciated that other manufacturing methods such as casting or machining from a workpiece are equally acceptable. By manufacturing the core part 10 from metal, a hard wearing running surface is provided for the recess 15 and bore 17 of the gypsy. Brass or stainless steel are suitable materials for operation in a marine environment.

In the manufacture of the core part, an array of rope grip features 26 is formed at the line-engagement region. Given that these are formed in the metallic core part, the rope grip features are metallic. The rope grip features are formed spaced around the line-engagement region 24.

The method of manufacture further includes the step of forming chain-engagement region 12 from a polymeric material. The chain-engagement region 12 comprises chain link pockets 18 sized and spaced around the chain-engagement region 12 to engage with the chain of the anchor rode. As will be understood, the use of a polymeric material in this manner allows the reduction or avoidance of metal-on-metal contact between the gypsy and the chain of the anchor rode.

The core part 10 and the chain-engagement region 12 are attached together through keying features 30 in the core part 10. Preferably, the chain-engagement region 12 is formed by an injection moulding process in which the core part 10 is held in a suitable mould and precursor polymeric material is injected into a mould space formed adjacent the core part 10 and solidified (e.g. by cooling or curing or both). By using a moulding process to form the chain link pockets 18 in the chain-engagement region 12, relatively complex shapes can be formed economically, compared to fabricating the part from a metallic material. Alternatively, the chain-engagement region 12 may be formed separately by a moulding process and include interlocking tabs which interlock with corresponding features in the core part 10.

The chain-engagement region 12 may be formed from a void-less polymer monolith, but preferably the chain-engagement region is moulded as a shell with suitable strengthening ribs 34 and corresponding voids.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gypsy, adapted for mounting in a windlass for hauling and/or veering anchor rode, the gypsy comprising:
   a chain-engagement region comprising chain link pockets sized and spaced around the chain-engagement region to engage with chain of the anchor rode;
   a line-engagement region with an array of rope grip features spaced around the line-engagement region,
   wherein the chain-engagement region of the gypsy is formed from a polymeric material and the line-engagement region is formed from a metal material.

2. A gypsy according to claim 1 further comprising a core part or core parts for engaging with a shaft of the windlass formed from the metal material.

3. A gypsy according to claim 2 wherein the core part or core parts includes a cone shaped recess disposed symmetrically around the axis of rotation of the gypsy for engaging with a cone clutch as part of a brake of the windlass.

4. A gypsy according to claim 2 wherein the core part or core parts provide the line-engagement region and the rope grip features.

5. A gypsy according to claim 4 wherein the line-engagement region has a narrower maximum axial extent than the chain-engagement region.

6. A gypsy according to claim 2 wherein the polymeric material has lower density than the metal material of the core part or core parts of the gypsy.

7. A gypsy according to claim 1 wherein the chain-engagement region has one or more strengthening ribs formed in it that define between them voids, resulting in a lower weight for the same overall size of gypsy.

8. A gypsy according to claim 7 wherein the ribs and voids are formed at a surface of the gypsy other than a surface of the chain link pockets.

9. A method of manufacturing a gypsy for mounting in a windlass for rotation for hauling and/or veering anchor rode, wherein the gypsy has a chain-engagement region comprising chain link pockets sized and spaced around the chain-engagement region to engage with chain of the anchor rode, and a line-engagement region comprising an array of rope grip features spaced around the line-engagement region, the process including the steps:

forming the line-engagement region of the gypsy from a metal material; and forming the chain-engagement region of the gypsy from a polymeric material.

10. A method according to claim 9 further including the step of forming a core part or parts of the gypsy from a metal material.

11. A method according to claim 10 wherein the rode-engagement region is formed over the core part by a moulding process.

* * * * *